Patented July 18, 1944

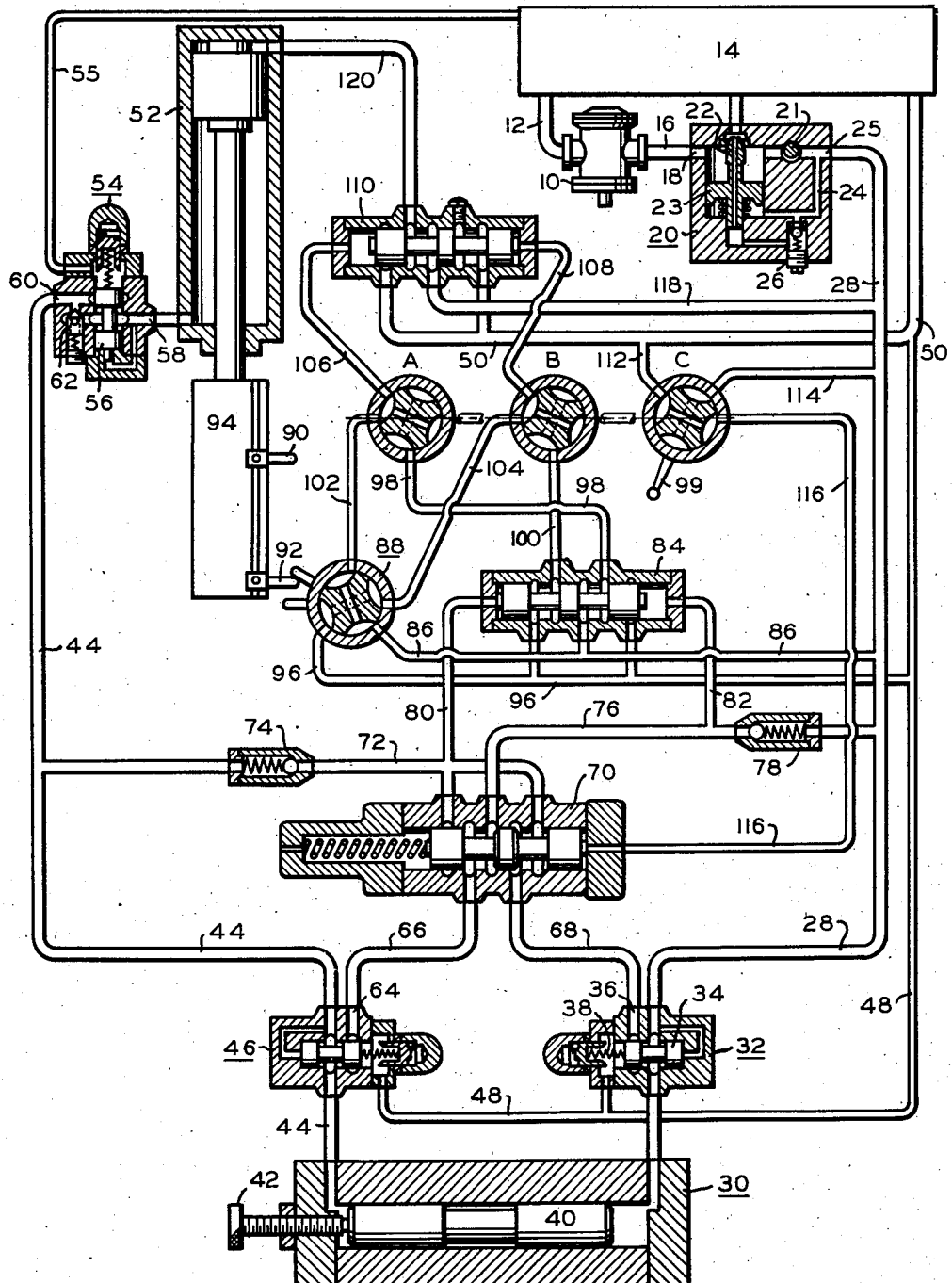

2,353,791

UNITED STATES PATENT OFFICE 2,353,791

POWER TRANSMISSION

Robert A. Shartle, Rockford, Ill., assignor to Vickers Incorporated, Detroit, Mich., a corporation of Michigan Application June 29, 1942, Serial No. 448,895

4 Claims. (Cl. 60—52)

This invention relates to power transmissions, particularly to those of the type comprising two or more fluid pressure energy translating devices, one of which may function as a pump and another as a fluid motor.

The invention is more particularly concerned with a hydraulic system for actuating an alternately reciprocating machine tool slide, for example, that of a honing machine.

In some cases it is desirable to interrupt the normal reciprocating cycle of the machine through its full intended stroke and to cause temporarily a cycle of very short stroke reciprocation to correct for inaccuracies in the work by a localized application of the tool. It is furthermore necessary, particularly with a honing machine, that the short stroking mechanism be so arranged that it is impossible to accidentally cause the short stroking operation to take place with any overtravel beyond the limits of the normal full stroke reciprocation.

It is an object of the present invention to provide an improved hydraulic power transmission system adapted to operate a reciprocating slide through both a normal long stroke and alternatively at will through a short reciprocating stroke at any point along the length of the long stroke.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system incorporating a preferred form of the present invention.

In the embodiment of the invention shown in the drawing, 10 represents a constant displacement pump of conventional construction adapted to be driven by a suitable prime mover, not shown. Pump 10 is provided with a suction conduit 12 for withdrawing fluid from a tank 14 and a delivery conduit 16 for directing the delivery therefrom to one port 18 of a combined flow control and relief valve 20. The latter may be of the construction such as illustrated in the patent to Harry F. Vickers, No. 2,102,865, designed to control the rate of oil flow into the system and also to function as a pressure relief valve which automatically operates at the minimum pressure necessary to maintain this flow. The combination valve 20 comprises an adjustable orifice 21 together with a hydrostatic valve 22 under the control of a piston 23 which is subjected to the pressure to the left of the orifice on its upper face and to the pressure to the right of the orifice on its lower face through passage 24, so that valve 22 is caused to open or close to maintain a constant pressure drop through the orifice 21 regardless of pressure variations at the port 25. Passage 24 thereof communicates with an adjustable relief device 26 which will limit the maximum system pressure as desired.

Port 25 of combination valve 20 is connected to a conduit 28 which extends to one side of a volumetric displacement cylinder 30, passing through a sequence valve 32. The latter is of the construction, such as disclosed in the Herman Patent No. 2,200,824, comprising a pressure responsive valve 34 which allows pressure fluid to flow into port 36 whenever a predetermined pressure for which the valve spring 38 has been adjusted has been reached. Metering cylinder 30 consists of a cylindrical body containing a floating piston 40 therein and an adjusting screw 42 on the left end thereof to regulate the quantity of liquid to be metered. The lefthand end of metering cylinder 30 is connected to a conduit 44 which also incorporates a sequence valve 46 similar to valve 32 above described. The two valves 46 and 32 are externally drained by drain line 48 which communicates with a tank conduit 50.

Conduit 44 extends beyond sequence valve 46 to the rod end of a piston-and-cylinder motor 52, passing through a counterbalance valve 54 whose operation is similar to that of the sequence valve hereinbefore disclosed. Counterbalance valve 54 includes a pressure responsive valve 56 which causes the liquid discharging from the rod end of the motor 52 to encounter a resistance at port 58 before flowing into port 60. Valve 54 is set to open at a pressure slightly higher than that created by the weight of the piston and attached slide of the motor 52. Valve 54 also includes an integral check valve 62 which provides for reverse free flow. It is drained through a conduit 55.

Sequence valves 46 and 32 have their discharge ports 64 and 36 connected to conduits 66 and 68, respectively, which extend to a spring-offset, pilot-operated, reverse valve 70. The two end ports of valve 70 are connected to a conduit 72 which communicates with the conduit 44 through a check valve 74, while the center port connects by conduit 76 to conduit 28 through a check valve 78. Conduits 72 and 76 have branch conduits 80 and 82, respectively, which extend to either pilot operating chamber of a pilot-operated reverse valve 84 of conventional construction. The pressure port thereof is connected to a conduit 86 which communicates with the conduit 28 and also with the pressure port of a rotary four-way pilot valve 88. The latter is adapted to be mechanically operated by adjustable dogs 90 and 92 carried by a main slide 94.

The tank ports of the pilot valve 84 connect with a conduit 96 which communicates with another tank conduit 48 and also with the tank port of the rotary pilot valve 88. The cylinder ports of valve 84 connect by conduits 98 and 100 to the "A" and "B" portions, respectively, of a triple-deck rotary pilot valve. The latter connect by conduits 102 and 104 to the cylinder ports of the rotary pilot valve 88 and also by conduits 106 and 108, respectively, to either pilot operating chamber of a reversing valve 110. The "C" portion of the triple-deck valve has its tank port connected to a conduit 112 which communicates with the conduit 50, and its pressure port connected by a conduit 114 to the conduit 28. The cylinder port thereof is connected by a conduit 116 which extends to the pilot chamber of the valve 70.

The pressure port of reversing valve 110 communicates with the main pressure conduit 28 through a conduit 118, while the tank ports communicate with the tank through the conduit 50. The left-hand cylinder port thereof connects by a conduit 120 to the head end of the motor 52, while the righthand cylinder port is plugged.

In operation, with the circuit conditioned for normal stroking operation, illustrated, pump 10 withdraws fluid from the tank 14 and delivers it through combination valve 20 at a predetermined rate to the main pressure conduit 28. The latter will direct the pressure fluid into auxiliary conduit 118 where it is caused to flow through the reversing valve 110 to the head end of the motor 52. This will force the piston therein downwardly, with the exhaust fluid flowing through the counterbalance valve 54, conduit 44, and into the metering cylinder 30, thus causing piston 40 to move to the right. This expels fluid into conduit 28 providing for a differential action downward. Upon the piston 40 reaching the end of its stroke, pressure in conduit 44 will increase until it reaches the setting of sequence valve 46 which will then bypass the fluid into conduit 66. The pressure fluid will then be directed through valve 70, into conduit 76, through check valve 78 and into conduit 28, continuing the downward movement of the motor 52 differentially.

Motor 52 will continue its downward movement until dog 90 on slide 94 shifts the rotary valve 88, connecting conduits 86 and 104 and conduits 102 and 96. This will direct the pilot pressure through the "B" portion of the triple-deck rotary valve and into conduit 108 to thereby shift valve 110, connecting the pressure port thereof with the plugged cylinder port and conduit 120 with the tank conduit 50. The pressure in conduit 28 will now be caused to flow to the righthand end of metering cylinder 30, shifting the piston 40 therein back to the position shown, expelling liquid into conduit 44. When the piston 40 reaches the end of its stroke, pressure will rise in conduit 28 causing sequence valve 32 to bypass the fluid flow into conduit 68 where it is directed through valve 70, into conduit 72, through check valve 74 and into conduit 44 to continue the upward movement of motor 52. The latter will exhaust liquid through conduit 120, valve 110 and tank conduit 50 to the tank 14. The motor 52 will continue its upward movement until dog 92 thereof again shifts rotary valve 88 to the position shown, thus continuing the oscillatory movement.

It will be noted that, although pilot valve 84 is shifted by the pressure fluid traversing either conduit 72 or 76, it is rendered ineffective on valve 110 by the "A" and "B" portions of the triple-deck rotary valve.

To provide for the short stroking operation, the triple-deck rotary valve is shifted to connect conduits 98 and 106 through the "A" portion, conduits 100 and 108 through the "B" portion, and conduits 114 and 116 through the "C" portion. It will be seen that the conduits 102 and 104 of rotary valve 88 will be blocked by the "A" and "B" portions, respectively, as well as conduit 112 of the "C" portion. The latter will direct pilot pressure fluid through conduit 116 to the valve 70, shifting it so as to connect conduit 68 with conduit 76 and conduit 66 with conduit 72. Thus, the shifting of the triple-deck valve will render ineffective the rotary pilot valve 88 and condition the circuit for the short stroking operation under control of pilot valve 84.

Assuming that the piston of motor 52 is moving downwardly when the short stroking lever 99 is shifted, the pressure fluid is traversing conduit 118, reversing valve 110 and conduit 120. With piston 40 of metering valve 30 shifted to the righthand end of its stroke, by the very first downward movement of piston 52, pressure will immediately build up in conduit 44 beyond the setting of valve 46 and will be bypassed into conduit 66 where it will flow through valve 70 and into conduit 72, blocking this circuit. Pressure fluid will now be directed into auxiliary pilot conduit 80 to thereby shift valve 84, connecting the pressure port thereof with the lefthand cylinder port and the righthand cylinder port with the tank port thereof. This will cause pilot pressure from conduit 86 to flow through conduit 100 and into conduit 108 to thereby shift valve 110, with the discharging pilot fluid traversing conduits 106, 98, valve 84, conduits 96, 48 and 50 to the tank. This will connect the pressure port of valve 110 with the plugged port and the lefthand cylinder port with the tank port, thus directing the pump delivery through conduit 28 to metering cylinder 30, causing the piston 40 therein to discharge fluid into conduit 44 and to the rod end of motor 52, returning the piston a distance equal to the displacement of the metering cylinder 30. Upon the piston 40 of metering cylinder 30 reaching the end of its stroke, pressure will build up in conduit 28, causing valve 32 to bypass the flow into conduit 68 where it will flow through valve 70 and into conduit 76, again forming a blocked circuit, preventing any further delivery of oil to the rod end of the motor 52.

Pressure fluid in conduit 76 will now be directed into auxiliary pilot conduit 82 to thereby shift valve 84 to the position shown. This will direct the pilot pressure into conduit 98 where it will flow through the A portion of the triple-deck valve and into conduit 106 to thereby shift reversing valve 110 to the position shown, with the exhausting pilot fluid traversing conduit 108, the B part of the rotary valve, conduit 100, valve 84, conduit 96 and conduits 48 and 50 to tank. This short stroking operation will continue until the triple-deck rotary valve is again shifted to the position shown.

Thus, it will be seen that the invention provides a means for short stroking a differential motor at any position within the normal stroke thereof. It is to be noted that the first thing to occur when short stroking is initiated is an immediate reversal of the slide 84. In this way overtravel of the slide beyond its normal stroke is prevented.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination with a source of pressure fluid, a reciprocable fluid motor, means including a reverse valve and connections for supplying fluid to the motor to operate the same through alternate strokes of normal length in opposite directions, and additional means for controlling the flow of fluid to the motor to operate the same through alternate strokes of shorter length in opposite directions, said additional means including a volumetric displacement metering device.

2. In a hydraulic power transmission system the combination with a source of pressure fluid, a reciprocable fluid motor, means including a reverse valve and connections for supplying fluid to the motor to operate the same through alternate strokes of normal length in opposite directions, and additional means for controlling the flow of fluid to the motor to operate the same through alternate strokes of shorter length in opposite directions, said connections including a fluid quantity measuring device, means for causing a continued flow through said connections after said quantity has been measured at the beginning of a normal stroke, and means selectively operable to prevent such continued flow to thereby cause the motor to operate with shorter strokes.

3. In a hydraulic power transmission system the combination with a source of pressure fluid, a reciprocable fluid motor, a directional control valve of the pilot-operated type for controlling the direction of fluid flow to the motor, connections between the pump, the valve and the motor, a volumetric displacement metering device comprising a cylinder having a free piston therein and placed in series in one of said connections, means operable when the free piston has completed a stroke in either direction for permitting continued flow through said one connection in the same direction, and a valve selectively operable to disable the last-named means whereby the stroke of the fluid motor is limited to a distance determined by the volumetric displacement of the metering device.

4. In a hydraulic power transmission system the combination with a source of pressure fluid, a reciprocable fluid motor, a directional control valve of the pilot-operated type for controlling the direction of fluid flow to the motor, means responsive to travel of the motor through a predetermined distance for operating said directional valve to reverse the motor, connections between the source, the valve and the motor, a volumetric displacement metering device comprising a cylinder having a free piston therein and placed in series in one of said connections, means responsive to operation of the free piston in completing a stroke in either direction for permitting continued flow through said one connection in the same direction, means responsive to travel of the free piston for operating said directional valve, and a selectively operable valve means to render both said free-piston responsive means effective and simultaneously disable said motor-travel responsive means whereby the stroke of the fluid motor is limited to a distance determined by the volumetric displacement of the metering device.

ROBERT A. SHARTLE.